United States Patent
Kuo et al.

(10) Patent No.: US 7,598,691 B2
(45) Date of Patent: Oct. 6, 2009

(54) CURRENT CONTROL DEVICE AND METHOD

(75) Inventors: Po-Tsun Kuo, Taoyuan Hsien (TW); Wen-Chuan Ma, Taoyuan Hsien (TW); Ming-Shi Tsai, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 476 days.

(21) Appl. No.: 11/484,716

(22) Filed: Jul. 12, 2006

(65) Prior Publication Data

US 2007/0044756 A1 Mar. 1, 2007

(30) Foreign Application Priority Data

Aug. 24, 2005 (TW) ............... 94128836 A (51) Int. Cl.
*H02P 7/00* (2006.01)
*H02K 17/32* (2006.01)
*H02K 23/68* (2006.01)
*H02K 27/30* (2006.01)

(52) U.S. Cl. ............... 318/434; 318/432; 318/400.22

(58) Field of Classification Search ............... 318/434, 318/432, 400.22
See application file for complete search history.

(56) References Cited

U.S. PATENT DOCUMENTS 6,650,075 B2 * 11/2003 Otsuka et al. ............... 318/268
6,747,432 B2 * 6/2004 Yoshimura .................. 318/599

\* cited by examiner

*Primary Examiner*—Rina I Duda
*Assistant Examiner*—Erick Glass
(74) *Attorney, Agent, or Firm*—Birch, Stewart, Kolasch & Birch, LLP (57) ABSTRACT

A current control device for a fan motor includes a current sampling module, a signal generating module, a current detecting module and a current controlling module. The current sampling module samples an operating current of the fan motor to generate a sampled current signal. The operating current is controlled according to a driving signal. The signal generating module generates a threshold current signal. The current detecting module receives the sampled current signal and the threshold current signal and generates a motor protecting signal according to the sampled current signal and the threshold current signal. The current controlling module receives the motor protecting signal and stops generating or decreases the driving signal according to the motor protecting signal.

22 Claims, 7 Drawing Sheets

CURRENT CONTROL DEVICE AND METHOD

BACKGROUND OF THE INVENTION

1. Field of Invention

The invention relates to a current control device and, in particular, to a current control device for controlling a current of a motor.

2. Related Art

Motors are widely used in fans or various types of electrical devices. However, if an operating current of the motor is too high for a long time, the motor tends to burn out.

Figure 1:
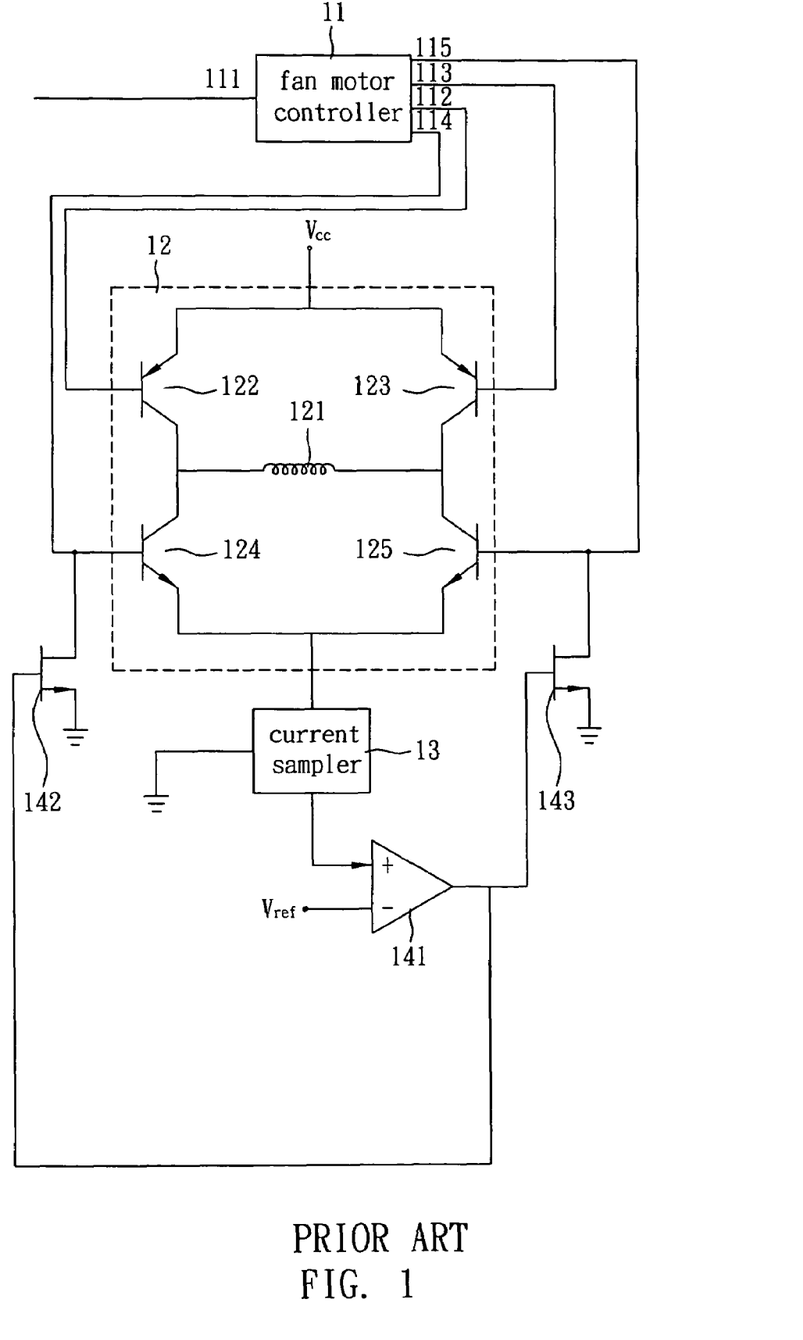
FIG. 1 is a block diagram showing the conventional current controller for a fan motor.

Referring to FIG. 1, a fan motor controller 11 generates driving currents 112 to 115 according to a rotating speed controlling signal 111. A fan motor 12 includes a coil 121 and a plurality of transistors 122, 123, 124 and 125. Driving currents 112, 113 114 and 115 are respectively inputted to the transistors 122 to 125 to control an operating current of the coil 121. An input voltage $V_{cc}$ is electrically connected to sources of the transistors 122 and 123. One terminal of the coil 121 is electrically connected to the transistors 122 and 124. The other terminal of the coil 121 is electrically connected to the transistors 123 and 125. Emitters of the transistors 124 and 125 are electrically connected to a current sampler 13. The current sampler 13 samples current values from the emitters of the transistors 124 and 125. A comparator 141 compares a voltage of the sampled result of the current sampler 13 with a reference voltage $V_{ref}$. When the sampled voltage is too high in comparison of the $V_{ref}$, the two transistors 142 and 143 turn on to adjust the driving currents 114 and 115 and decrease the operating current of the coil 121.

Controlling the transistors 142 and 143 can decrease the operating current of the coil 121. It is possible to prevent the coil 121 from burning out due to the too-high operating current. However, the driving currents 114 and 115 generated by the fan motor controller 11 are not decreased. When the transistors 142 and 143 are disabled, the operating current of the coil 121 is still too high. Thus, the main reason of causing the too-high operating current of the coil 121 is not eliminated.

Therefore, it is an important subject of the invention to provide a current control device that can control the driving current for driving the motor, so as to prevent the too-high operating current of the motor caused by the improper control of the driving current, and thus to lengthen the lifetime of the motor.

SUMMARY OF THE INVENTION

In view of the foregoing, the invention is to provide a current control device capable of adjusting an operating current of a motor.

To achieve the above, a current control device for a fan motor according to the invention includes a current sampling module, a signal generating module, a current detecting module and a current controlling module. The current sampling module samples an operating current of the fan motor to generate a sampled current signal. The operating current is controlled according to a driving signal. The signal generating module generates a threshold current signal. The current detecting module receives the sampled current signal and the threshold current signal, and generates a motor protecting signal according to the threshold current signal and the sampled current signal. The current controlling module receives the motor protecting signal and stops generating or decreases the driving signal according to the motor protecting signal.

In addition, the invention also discloses a current control device, which receives an operating current sampling signal of a fan motor module. The current control device includes a signal generating module, a current detecting module, and a current controlling module. The signal generating module generates a threshold current signal. The current detecting module receives the operating current sampling signal and the threshold current signal, and then generates a motor protecting signal according to the threshold current signal and the operating current sampling signal. The current controlling module receives the motor protecting signal, and then stopping generating or decreasing a driving signal according to the motor protecting signal. In this case, the driving signal controls the rotation of the fan motor.

Furthermore, the invention also provides a current control method for a fan motor. The current control method includes a current sampling step, a signal generating step, a current detecting step and a current controlling step. According to the current control method, the current sampling step is to sample an operating current of the fan motor to generate a sampled current signal. The operating current is controlled according to a driving signal. The signal generating step is to generate a threshold current signal. The current detecting step is to detect the sampled current signal to generate a motor protecting signal according to the threshold current signal. The current controlling step is to stop generating or decrease the driving signal according to the motor protecting signal.

As mentioned above, the current control device and method of this invention generate a motor protecting signal according to the threshold current signal and the sampled current signal, and stop generating or decrease the driving signal of the fan motor. Accordingly, the conditions that the motor has the too-high operating current can be efficiently prevented and, as a result, the operating lifetime of the motor can be lengthened.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2:
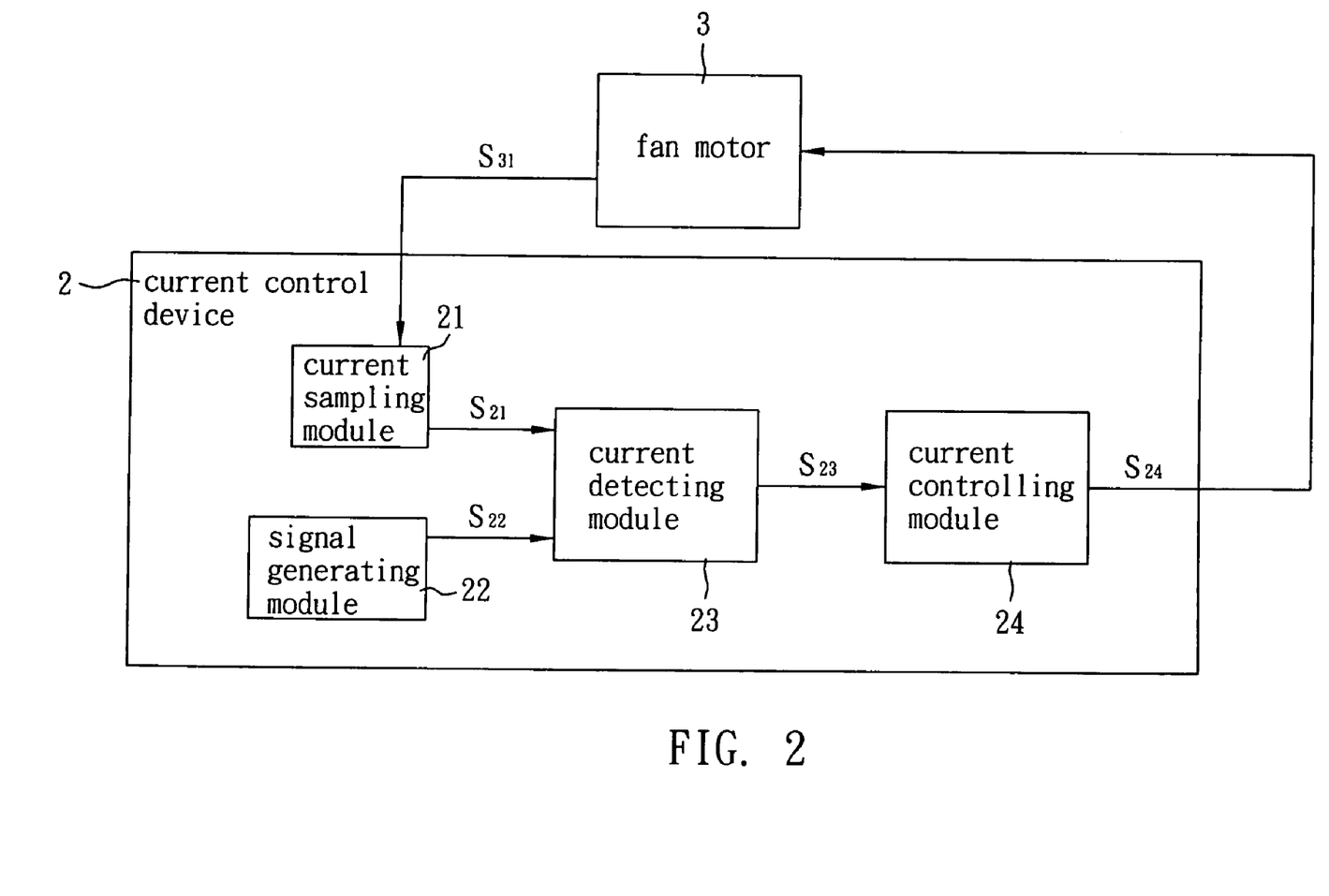
FIG. 2 is a block diagram showing a current control device according to a preferred embodiment of the invention.

Referring to FIG. 2, a current control device 2 for a fan motor 3 according to a preferred embodiment of the invention includes a current sampling module 21, a signal generating module 22, a current detecting module 23 and a current controlling module 24.

The current sampling module 21 samples an operating current $S_{31}$ of the fan motor 3 to generate a sampled current signal $S_{21}$. The operating current $S_{31}$ can be controlled according to a driving signal $S_{24}$. The signal generating module 22 generates a threshold current signal $S_{22}$. The current detecting module 23 receives the sampled current signal $S_{21}$ and the threshold current signal $S_{22}$, and generates a motor protecting signal $S_{23}$ according to the threshold current signal $S_{22}$ and the sampled current signal $S_{21}$. The current controlling module 24 receives the motor protecting signal $S_{23}$, and stops generating or decreases the driving signal $S_{24}$ according to the motor protecting signal $S_{23}$. Since the operating current $S_{31}$ is controlled by the driving signal $S_{24}$, the operating current $S_{31}$ can be decreased.

The threshold current signal $S_{22}$ is set as a current upper bound of the operating current $S_{31}$. The current detecting module 23 compares the sampled current signal $S_{21}$ with the threshold current signal $S_{22}$ to judge whether or not the operating current $S_{31}$ of the fan motor 3 exceeds a current value set according to the threshold current signal $S_{22}$. If the operating current $S_{31}$ is greater than the current upper bound set according to the threshold current signal $S_{22}$, the current detecting module 23 generates the motor protecting signal $S_{23}$ to enable the current controlling module 24 to stop generating or decrease the driving signal $S_{24}$ so as to decrease the operating current $S_{31}$.

In addition, the current controlling module 24 of this embodiment may be a controller. The current controlling module 24 may be interrupted by the motor protecting signal $S_{23}$ to execute a current controlling procedure, which stops generating or decreases the driving signal. Furthermore, the current detecting module 23 and the current controlling module 24 may be integrated in the same controller.

Figure 3:
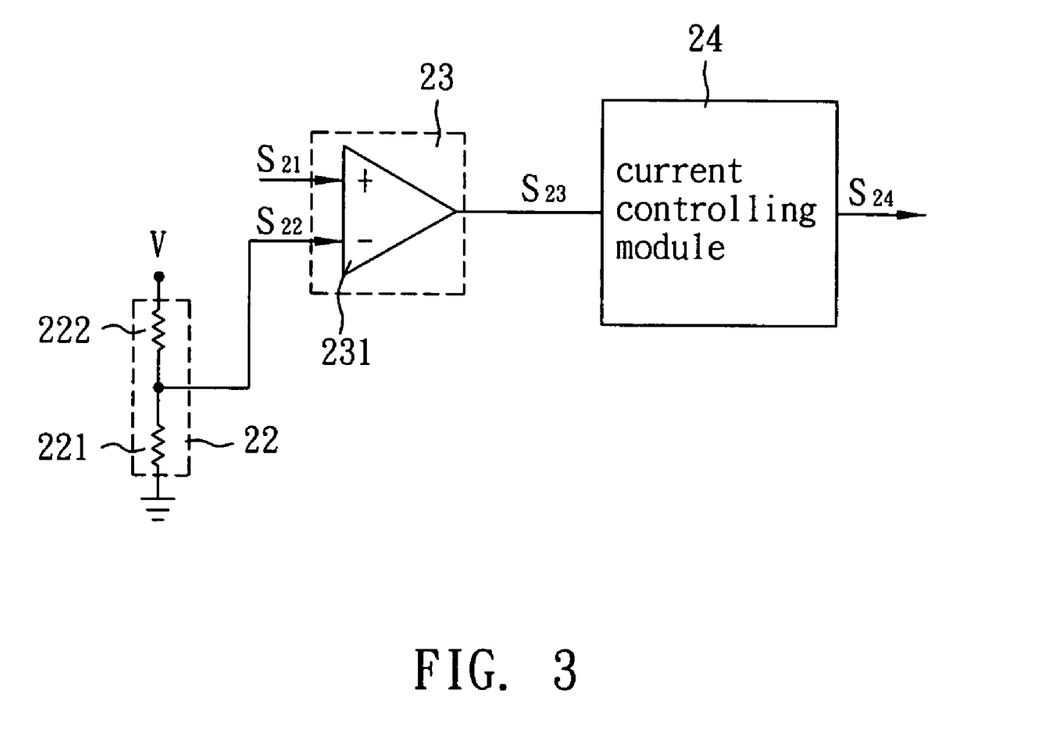
FIG. 3 is a block diagram showing a current detecting module including a comparator in the current control device according to the preferred embodiment of the invention.

Referring to FIG. 3, the signal generating module 22 includes a first resistor 221 and a second resistor 222. The first resistor 221 has one grounded terminal and the other terminal electrically connected to the second resistor 222. The other terminal of the second resistor 222 receives a power V to generate the threshold current signal $S_{22}$.

The current detecting module 23 includes a comparator 231 for receiving the sampled current signal $S_{21}$ from the current sampling module 21 (not shown in FIG. 3) and the threshold current signal $S_{22}$ from the signal generating module 22 and generating the motor protecting signal $S_{23}$ according to the threshold current signal $S_{22}$ and the sampled current signal $S_{21}$. In this embodiment, the comparator 231 is an amplifier.

Figure 4:
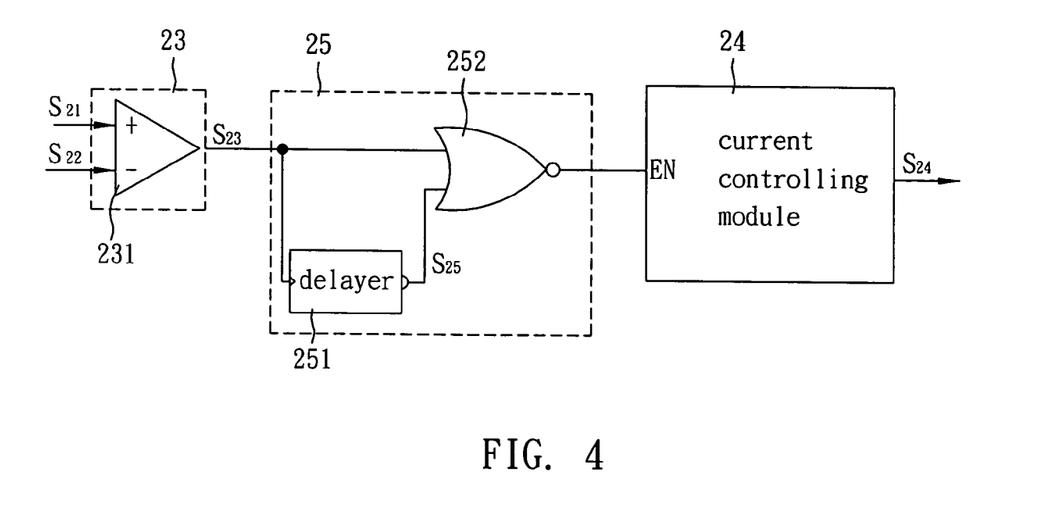
FIG. 4 is a block diagram showing a time controlling module including a delayer in the current control device according to the preferred embodiment of the invention.
Figure 5:
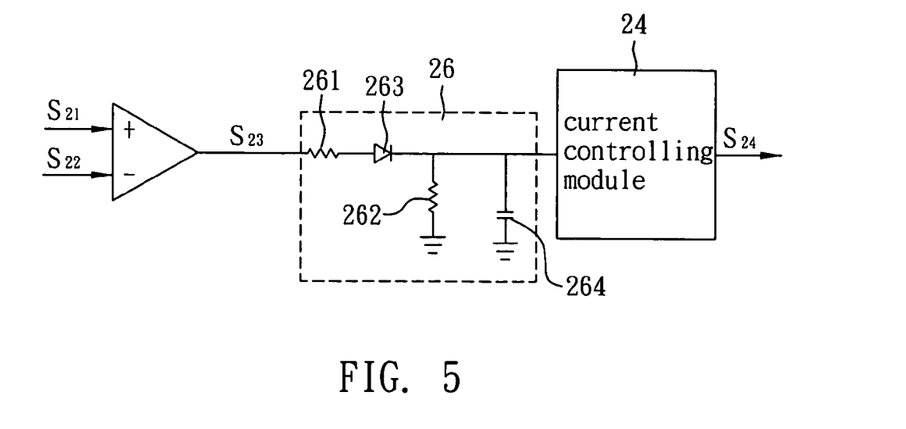
FIG. 5 is a block diagram showing the time controlling module including two resistors in the current control device according to the preferred embodiment of the invention.

As shown in FIGS. 4 and 5, the current controlling module 24 of the embodiment can be a controller. The motor protecting signal is inputted to an enable pin EN of the controller 24. Thus, the controller 24 is enabled according to the motor protecting signal $S_{23}$. Accordingly, when the operating current $S_{31}$ is not greater than the current upper bound set according to the threshold current signal $S_{22}$, the motor protecting signal $S_{23}$ is set high to enable the current controlling module 24. If the operating current $S_{31}$ is greater than the current upper bound set according to or corresponding to the threshold current signal $S_{22}$, the current controlling module 24 is disabled to stop generating the driving signal $S_{24}$.

In order to stop generating the driving signal $S_{24}$ so as to decrease the operating current $S_{31}$ effectively, the current control device 2 may include a time controlling module between the current detecting module 23 and the controller 24 for controlling a disable period of the current controlling module 24 and thus controlling the period of the current controlling module 24 of stopping generating the driving signal $S_{24}$. During this period, the developer or the user can find or eliminate the factor causing the too-high operating current $S_{31}$.

As shown in FIG. 4, the current control device 2 further includes a time controlling module 25 having a delayer 251 and a logic gate 252. The delayer 251, which is electrically connected to the current detecting module 23, receives the motor protecting signal $S_{23}$ from the current detecting module 23 and generates a delaying signal $S_{25}$. The logic gate 252, which is electrically connected to the current detecting module 23 and the delayer 251, receives the motor protecting signal $S_{23}$ and the delaying signal $S_{25}$, respectively. The logic gate 25 controls an effective period of enabling or disabling the motor protecting signal $S_{23}$ inputted to the current controlling module 24 according to the delaying signal $S_{25}$. The delayer 251 may be a charge/discharge circuit or a flip-flop, such as a D-flip-flop or an RS-flip-flop. The logic gate 252 can be an NOR gate. Thus, the delayer 251 can lengthen the enable period of the delaying signal $S_{25}$, and the logic gate 252 can lengthen the period for the delaying signal $S_{25}$ to disable the current controlling module 24.

In another embodiment as shown in FIG. 5, the current control device 2 further includes a time controlling circuit 26 between the current detecting module 23 and the controller 24. The time controlling circuit 26 includes two resistors 261 and 262, a diode 263 and a capacitor 264. One terminal of the resistor 261 is electrically connected to the current detecting module 23 for receiving the motor protecting signal $S_{23}$. The diode 263 has one terminal connected serially to the resistor 261. The other terminal of the diode 263 is electrically connected to the capacitor 264 and the resistor 262. The capacitor 264 is connected in parallel to the resistor 262. The resistors 261 and 262 and the capacitor 264 can be properly configured such that the period of responding the motor protecting signal $S_{23}$ can be lengthened or shortened. Thus, the enable or disable period of the current controlling module 24 is controlled.

Figure 6:
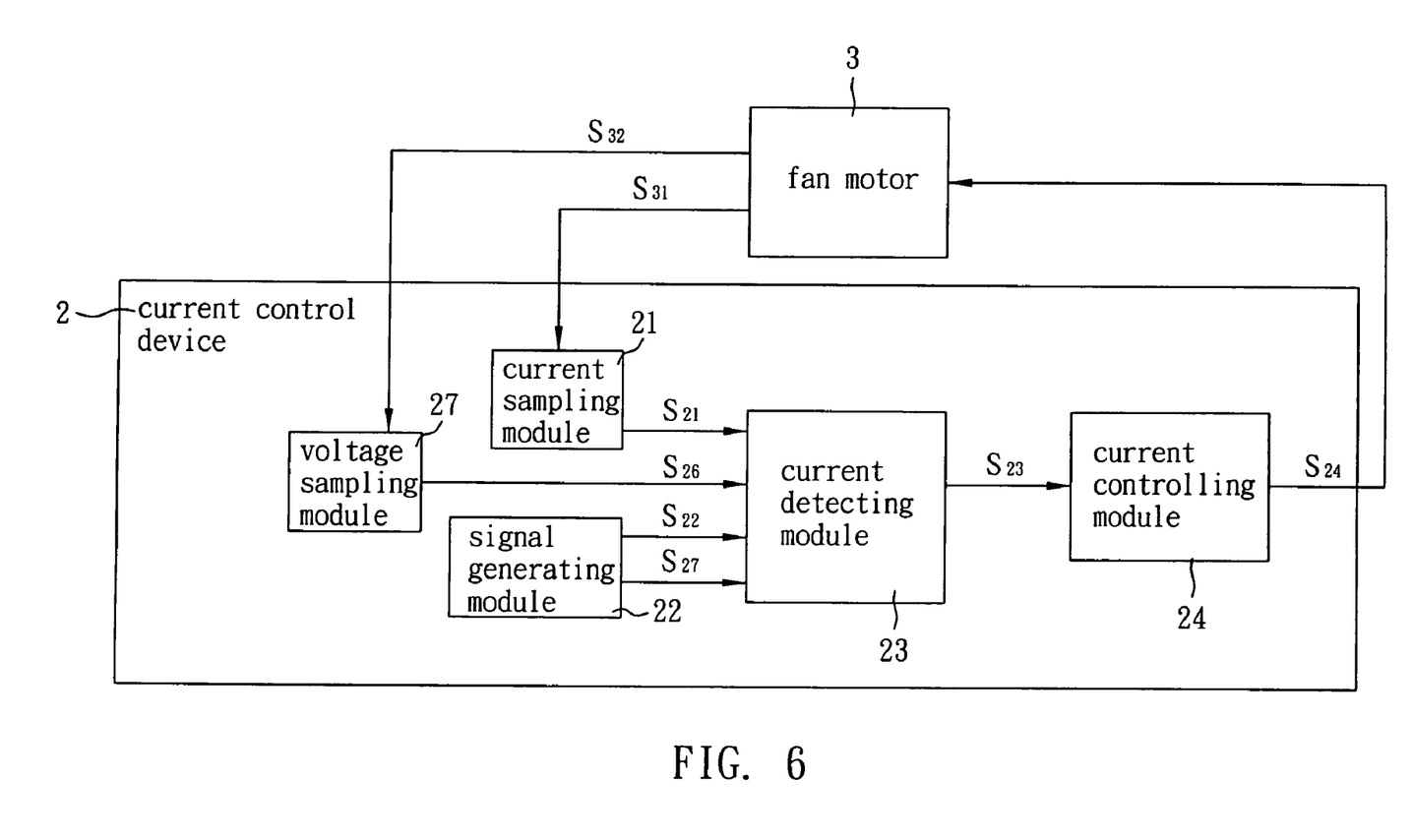
FIG. 6 is a block diagram showing a current control device including a voltage sampling module according to the preferred embodiment of the invention.

Referring to FIG. 6, the current control device 2 further includes a voltage sampling module 27 for sampling an operating voltage $S_{32}$ of the fan motor 3 to generate a sampling voltage signal $S_{26}$. The signal generating module 22 generates a threshold voltage signal $S_{27}$. The current detecting module 23 receives the sampled current signal $S_{21}$, the threshold current signal $S_{22}$, the sampling voltage signal $S_{26}$ and the threshold voltage signal $S_{27}$, and generates the motor protecting signal $S_{23}$ according to the sampled current signal $S_{21}$, the threshold current signal $S_{22}$, the sampling voltage signal $S_{26}$ and the threshold voltage signal $S_{27}$.

The threshold voltage signal $S_{27}$ is set as the voltage upper bound of the operating voltage of the fan motor 3. Thus, the current detecting module 23 can further compare the sampling voltage signal $S_{26}$ with the threshold voltage signal $S_{27}$ to judge whether or not the operating voltage of the fan motor 3 exceeds the voltage upper bound set according to the threshold voltage signal $S_{27}$. If the operating voltage is greater than the voltage upper bound set according to the threshold voltage signal $S_{27}$, the current detecting module 23 will generate the motor protecting signal $S_{23}$ to enable the current controlling module 24 so as to stop generating or decrease the driving signal $S_{24}$.

Figure 7:
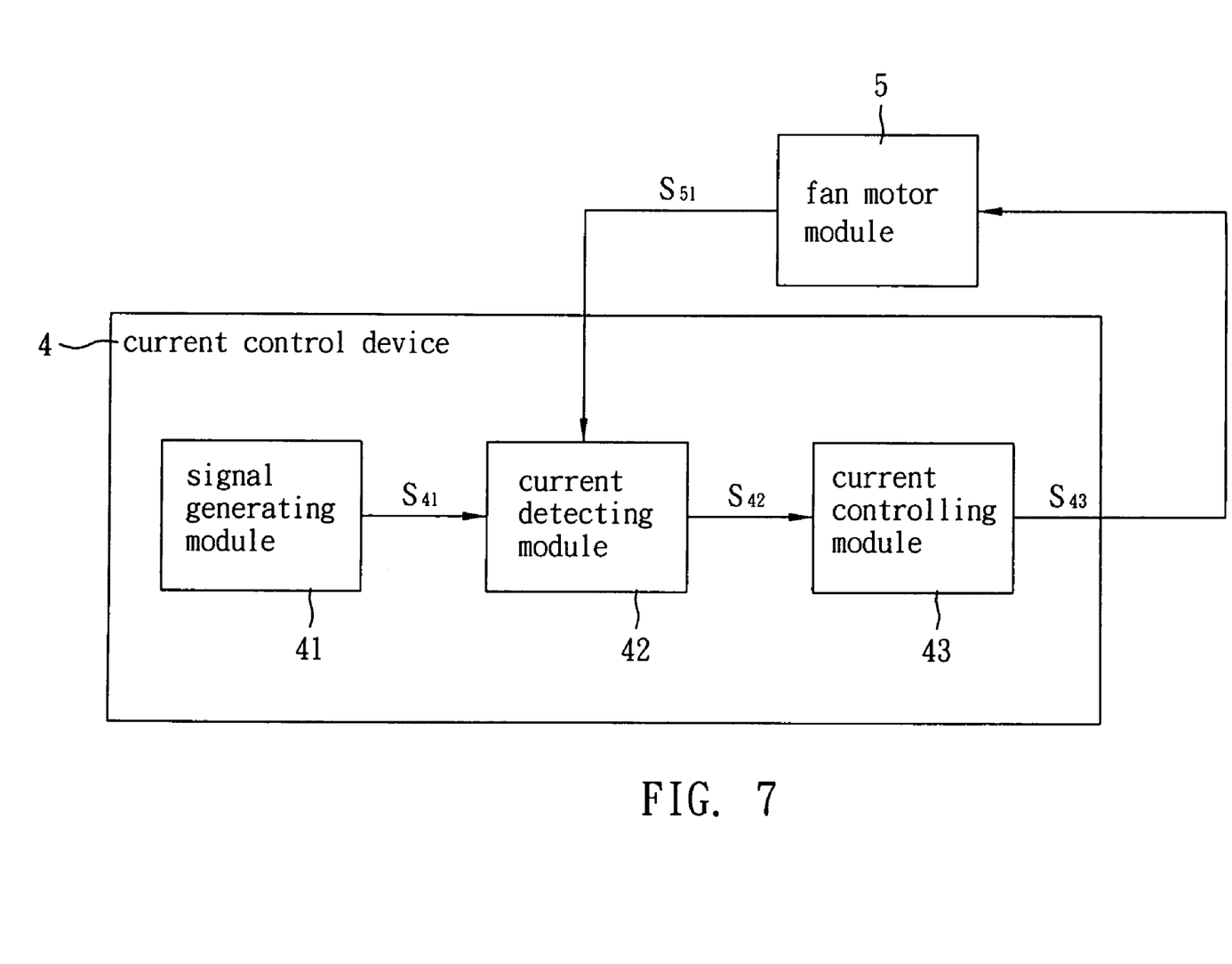
FIG. 7 is a block diagram showing another current control device according to the embodiment of the invention.

In addition, a current control device 4 according to a preferred embodiment of the invention receives an operating current sampling signal $S_{51}$ of a fan motor module 5, as shown in FIG. 7. The operating current sampling signal $S_{51}$ is generated by sampling an operating current of the fan motor module 5. The current control device 4 includes a signal generating module 41, a current detecting module 42 and a current controlling module 43. The signal generating module 41 generates a threshold current signal $S_{41}$. The current detecting module 42 receives the operating current sampling signal $S_{51}$ and the threshold current signal $S_{41}$, and generates a motor protecting signal $S_{42}$ according to the threshold current signal $S_{41}$ and the operating current sampling signal $S_{51}$. The current controlling module 43 receives the motor protecting signal $S_{42}$ and stops generating or decreases a driving signal $S_{43}$ according to the motor protecting signal $S_{42}$. In this case, the driving signal $S_{43}$ controls the rotation of the fan motor module 5.

When the operating current sampling signal $S_{51}$ is greater than the current corresponding to the threshold current signal $S_{41}$, the current controlling module 43 is disabled to stop generating the driving signal $S_{43}$.

In addition, the current controlling module 43 is interrupted by the motor protecting signal $S_{42}$ to execute a current controlling procedure, which stops generating or decreases the driving signal $S_{43}$ and can control a predetermined period for stopping generating or for decreasing the driving signal $S_{43}$. The user or the developer can set the predetermined period so as to decrease the operating current of the fan motor module 5 effectively and thus to protect the fan motor module 5.

The fan motor module 5 of this embodiment can correspond to the fan motor 3 and the current sampling module 21 in the previous embodiments shown in FIGS. 2 to 6, and the signal generating module 41, the current detecting module 42 and the current controlling module 43 of this embodiment can correspond to the signal generating module 22, the current detecting module 23 and the current controlling module 24 of the previous embodiments. The corresponding elements have the corresponding functions, and the detailed descriptions of the elements of the current control device 4 of this embodiment will be omitted.

Figure 8:
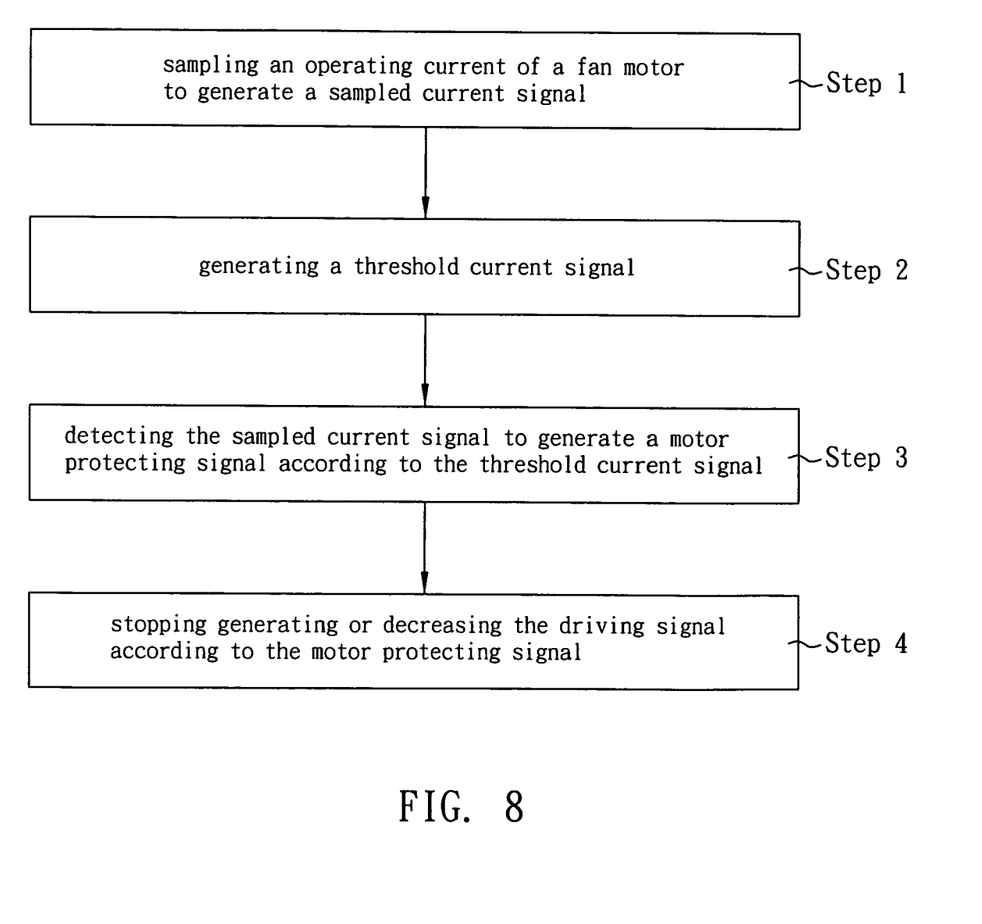
FIG. 8 is a flow chart showing a current control method according to a preferred embodiment of the invention.

Referring to FIG. 8, the current control method of this invention includes steps Step 1 to Step 4.

The step Step 1 is to sample an operating current of a fan motor to generate a sampled current signal. Herein, the operating current is controlled according to a driving signal.

The step Step 2 is to generate a threshold current signal.

The step Step 3 is to generate a motor protecting signal according to the threshold current signal and the sampled current signal.

The step Step 4 is to stop generating or to decrease the driving signal according to the motor protecting signal.

Because the current control method of this embodiment may be applied to the current control devices of the embodiments shown in FIGS. 2 to 6 and the current control method of this embodiment has been discussed in the embodiments of the current control devices, the detailed descriptions thereof are omitted for concise purpose.

In summary, the current control device and method of this invention generate a motor protecting signal according to the threshold current signal and the sampled current signal, and stop generating or decrease the driving signal of the fan motor. Accordingly, the conditions that the motor has the too-high operating current can be efficiently prevented and, as a result, the operating lifetime of the motor can be lengthened.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A current control device for a fan motor, comprising:
    a current sampling module for sampling an operating current of the fan motor to generate a sampled current signal, wherein the operating current is controlled according to a driving signal of the fan motor;
    a signal generating module for generating a threshold current signal;
    a current detecting module for receiving the sampled current signal and the threshold current signal and generating a protecting signal according to the threshold current signal and the sampled current signal; and
    a current controlling module for receiving the protecting signal and then stopping generating or decreasing the driving signal according to the protecting signal;
    wherein the signal generating module comprises:
        a first resistor having one grounded terminal; and
        a second resistor having one terminal connected to the first resistor in series and the other terminal for receiving a power so as to generate the threshold current signal.

2. The device according to claim 1, wherein current detecting module and the current controlling module are integrated into a controller.

3. The device according to claim 1, wherein the current detecting module is a controller and enabled by the protecting signal.

4. The device according to claim 3, wherein the protecting signal is set at a high level to enable the current controlling module.

5. The device according to claim 3, wherein when the operating current is greater than a current corresponding to the threshold current signal, the current controlling module is disabled so as to stop generating the driving signal.

6. The device according to claim 1, wherein the current controlling module is a controller, and the current controlling module is interrupted by the protecting signal to execute a current controlling procedure for stopping generating or decreasing the driving signal.

7. The device according to claim 6, wherein the current controlling procedure is to stop generating or decrease the driving signal for a predetermined period.

8. The device according to claim 1, further comprising:
    a time controlling module electrically connected to the current detecting module and the current controlling module for controlling an enabled period of the protecting signal.

9. The device according to claim 8, wherein the time controlling module comprises:
    a delayer electrically connected to the current detecting module for receiving the protecting signal and generating a delaying signal; and
    a logic gate electrically connected to the current detecting module and the delayer for receiving the protecting signal and the delaying signal, and controlling the enabled period for the protecting signal inputted to the current controlling module according to the delaying signal.

10. The device according to claim 8, wherein the time controlling module comprises:
a first resistor for receiving the protecting signal;
a diode having one terminal connected to the first resistor in series;
a second resistor; and
a capacitor connected in parallel to the second resistor and electrically connected to the other terminal of the diode for controlling the enabled period for the protecting signal.

11. The device according to claim 1, further comprising:
a voltage sampling module for sampling an operating voltage of the fan motor to generate a sampling voltage signal.

12. The device according to claim 11, wherein the signal generating module generates a threshold voltage signal so that the current detecting module receives the sampled current signal, the threshold current signal, the sampling voltage signal, and the threshold voltage signal, and generates the protecting signal according to the sampled current signal, the threshold current signal, the sampling voltage signal, and the threshold voltage signal.

13. The device according to claim 1, wherein the current detecting module comprises:
a comparator having one input terminal for receiving the sampled current signal, the other input terminal for receiving the threshold current signal, and an output terminal for generating the protecting signal according to the threshold current signal and the sampled current signal.

14. The device according to claim 13, wherein the comparator is an amplifier.

15. A current control method for a fan motor, the method comprising steps of:
a current sampling step for sampling an operating current of the fan motor to generate a sampled current signal, wherein the operating current is controlled by a driving signal of the fan motor;
a signal generating step for generating a threshold current signal by providing a first resistor having one grounded terminal, and a second resistor having one terminal connected to the first resistor in series and the other terminal for receiving a power so as to generate the threshold current signal;
a current detecting step for detecting the sampled current signal to generate a protecting signal according to the threshold current signal; and
a current controlling step for stopping generating or decreasing the driving signal according to the protecting signal.

16. The method according to claim 15, wherein current detecting step and the current controlling step are executed in a controller to enable the controller according to the protecting signal or interrupt the controller to execute a current controlling procedure for stopping generating or decreasing the driving signal.

17. The method according to claim 16, wherein the protecting signal is set at a high level to enable the controller.

18. The method according to claim 16, wherein when the operating current is greater than a current corresponding to the threshold current signal, the controller is disabled to stop generating the driving signal.

19. The method according to claim 15, further comprising:
a time controlling step for controlling an enabled period of the protecting signal.

20. The method according to claim 15, further comprising:
a voltage sampling step for sampling an operating voltage of the fan motor to generate a sampling voltage signal.

21. The method according to claim 20, wherein the signal generating step is to generate a threshold voltage signal, the current detecting step is to generate the protecting signal according to the sampled current signal, the threshold current signal, the sampling voltage signal, and the threshold voltage signal.

22. A current control device for a fan motor, comprising:
a current sampling module for sampling an operating current of the fan motor to generate a sampled current signal, wherein the operating current is controlled according to a driving signal of the fan motor;
a signal generating module for generating a threshold current signal;
a current detecting module for receiving the sampled current signal and the threshold current signal and generating a protecting signal according to the threshold current signal and the sampled current signal;
a current controlling module for receiving the protecting signal, and then stopping generating or decreasing a driving signal according to the protecting signal; and
a voltage sampling module for sampling an operating voltage of the fan motor to generate a sampling voltage signal;
wherein the signal generating module generates a threshold voltage signal so that the current detecting module receives the sampled current signal, the threshold current signal, the sampling voltage signal, and the threshold voltage signal, and generates the protecting signal according to the sampled current signal, the threshold current signal, the sampling voltage signal, and the threshold voltage signal.

* * * * *